April 11, 1961  R. E. SEARS ET AL  2,978,920
MEANS FOR PRELOADING BALL-TYPE SCREW
AND NUT ASSEMBLIES
Filed Oct. 20, 1958  2 Sheets-Sheet 1

INVENTORS
RICHARD E. SEARS & WALTER H. MORRIS
BY
Barnes, Kisselle, Raisch & Choate
ATTORNEYS

RICHARD E. SEARS & WALTER H. MORRIS INVENTORS

United States Patent Office

2,978,920
Patented Apr. 11, 1961

2,978,920
MEANS FOR PRELOADING BALL-TYPE SCREW AND NUT ASSEMBLIES

Richard E. Sears, Birmingham, and Walter H. Morris, Rochester, Mich., assignors to Beaver Precision Products, Inc., Clawson, Mich., a corporation of Michigan Filed Oct. 20, 1958, Ser. No. 768,201

5 Claims. (Cl. 74—441)

This invention relates to ball-type screw and nut assemblies and more particularly to a means for preloading a ball-type nut and screw assembly for eliminating all back-lash in the assembly.

Because of the well-known anti-friction characteristics of ball screw and nut arrangements, their use has become quite common in applications where a high efficiency drive is required between a rotatable member and a translatable member. It is not uncommon, for example, in machine tools to provide a ball screw drive between the translatable table of the machine tool and a rotating shaft for effecting such translatory movement of the table. In many such machine tools, the movement or the adjustment of the table or other element controlled by the ball screw must be very precise and the necessity thus arises for providing a ball screw and nut assembly between the driving mechanism and the driven member wherein all back-lash is eliminated.

It is an object of the present invention to provide a ball screw and nut assembly wherein back-lash between the screw and the nut is eliminated by preloading the screw in opposite directions through the medium of two ball nuts.

More specifically, the invention contemplates a drive arrangement wherein a pair of ball nuts are mounted on a ball screw and back-lash between the nut and the screw is eliminated by mounting one of the nuts for axial adjustment relative to the other while both nuts are prevented from rotating substantially relative to one another.

With an arrangement of this type, when one of the ball nuts is held in an axially fixed position and the other ball nut is shifted axially of the screw, the balls in the two nuts are loaded; that is, urged in axially opposite directions against the convolutions of the helical ball groove in the screw and thus, back-lash between the nut assembly and the screw is eliminated.

In arrangements of the type described wherein a gear stage is provided between the ball nut and a rotary shaft, the present invention renders it very feasible to simultaneously eliminate all back-lash between the nut and screw as well as the back-lash at the gear stage and at the thrust bearings supporting the respective members.

Figure 1:
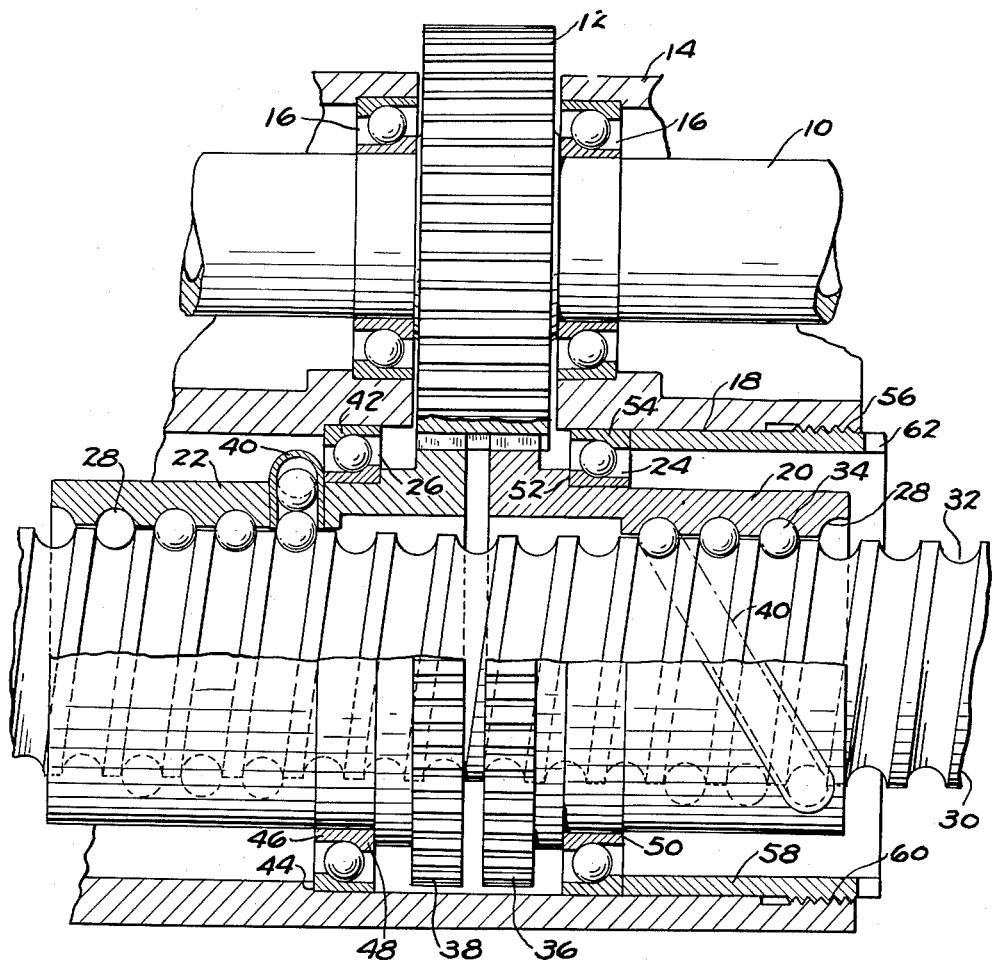
Figure 2:
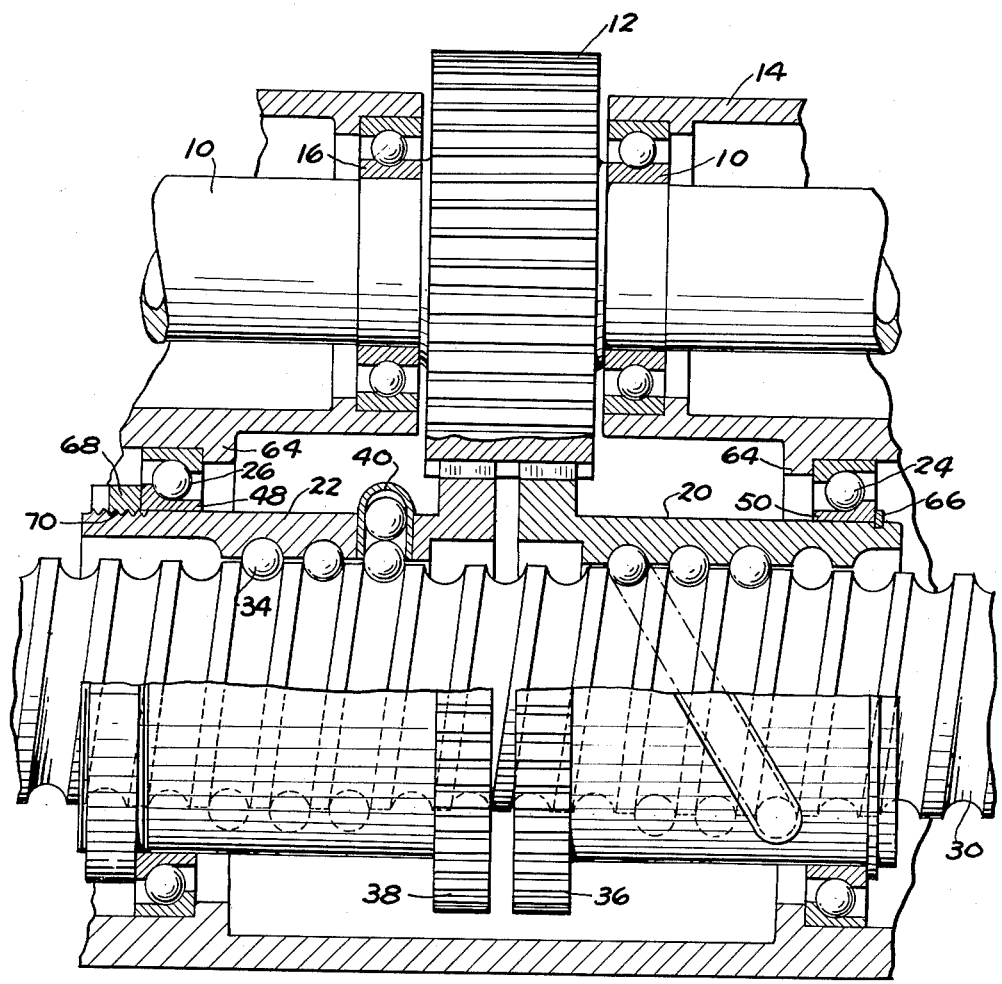

In the drawings, Fig. 1 is a sectional view of a ball screw and nut drive embodying the present invention; and Fig. 2 is a similar view of an alternate form of the invention.

Referring to Fig. 1, the numeral 10 designates a rotary shaft which may be considered as the driving member of the assembly illustrated. Shaft 10 has a gear 12 mounted thereon and the shaft is journalled for rotation in a support 14 by a pair of thrust bearings 16. Support 12 is formed with an axial bore 18 in which a pair of ball-type nut members 20 and 22 are journalled for rotation by means of opposed thrust bearings 24, 26, respectively. Each of the ball nuts 20, 22 is fashioned as a cylindrical sleeve having a helical ball groove 28 extending axially through the nut around the inner periphery thereof. The helical grooves 28 in the two ball nuts are of the same hand, lead and pitch.

A shaft 30 extends axially through the ball nuts 20, 22. Shaft 30 is fashioned around the outer periphery thereof with a helical ball groove 32 which corresponds with the grooves 28 in the ball nuts 20, 22. A train of balls 34 is provided within each nut 20, 22. Balls 34 interengage the nuts 20, 22 with the shaft 30 so that simultaneous rotation of the nuts 20, 22 in the same direction produces a translatory movement of shaft 30. At their adjacent ends, the nuts 20, 22 are formed with gears 36, 38 which mesh with gear 12 fixed on shaft 10.

The drive arrangement illustrated in the drawings is of the type that might be conventionally used on a machine tool. The work supporting table or other translatable component of the machine tool could be connected directly with shaft 30 so that its translatory movement is controlled by or corresponds with the translatory movement of shaft 30. In such an arrangement, the shaft 10 could be driven by any suitable means to effect translatory movement of the table. When shaft 10 is rotated, the interengagement of gear 12 with gears 36 and 38 causes nuts 20 and 22 to rotate simultaneously in the bore 18 of support 14. Rotation of the nuts 20 and 22 causes the balls 34 to travel through the aligned grooves in the nuts and the shaft 30 to thereby produce a translatory movement of shaft 30.

As is conventional, each nut 20, 22 is provided with a ball return tube 40 for recirculating the balls 34 from one end of the groove 28 in the nuts to the opposite end thereof.

It will be apparent that due to manufacturing tolerances, it is impractical, if not impossible, to machine the balls 34 and the grooves 28, 32 to such accuracy as to eliminate all back-lash between the nuts 20, 22 and the shaft 30. The same is true of the gears 36, 38 and the gear 12, as well as the thrust bearings 24, 26. The present invention provides a relatively simple arrangement for eliminating such back-lash. In the arrangement illustrated, this back-lash is eliminated by preloading the shaft 30 in opposite directions by means of the nuts 20, 22.

Referring more particularly to Fig. 1, it will be observed that the outer race 42 of thrust bearing 26 abuts axially against a shoulder 44 in bore 18 of support 14. The inner race 46 of thrust bearing 26 bears axially in the opposite direction against a shoulder 48 formed around the outer periphery of nut 2. The inner race 50 of thrust bearing 24 bears axially against a shoulder 52 formed around the outer periphery of nut 20, while the outer race 54 of bearing 24 is arranged for axial sliding movement within the bore 18 of support 14. Bore 18 is internally threaded at one end thereof as shown at 56. Within bore 18, there is arranged an adjusting sleeve 58 which is threaded as at 60 for engagement with the threaded portion 56 at the end of bore 18. The outer end of sleeve 58 may be slotted as at 62 for enterengagement with a spanner wrench.

To eliminate all back-lash in the arrangement described above, adjusting sleeve 58 is advanced inwardly of bore 18 as by turning with a spanner wrench. The inner end of sleeve 58 abuts against the outer race 54 of bearing 24 and the axial thrust is thus transmitted to nut 20 at shoulder 52 through the outer race 50 of bearing 24. Since nut 22 is axially fired in bore 18 by the arrangement of thrust bearing 26, it is apparent that axial inward movement of nut 20 by reason of the interengagement of the grooves of the two nuts with the groove in the shaft 30 through the balls 34 causes the shaft 30 to be loaded in one direction by the balls 34 in nut 20 and to be loaded in the opposite direction by the balls 34 in the nut 22. Thus, back-lash between the two nuts and the groove 32 in shaft 30 is eliminated as is the axial clearance in the two thrust bearings 24, 26. The inward adjustment of sleeve 58 also tends to rotate the nuts 20 and 22 in opposite directions on shaft 30. Thus, the teeth of gear 36 are brought into pressure engagement with one side of the teeth of gear 12 and the teeth 38 are brought into pressure engagement with the opposite sides of the teeth in the gear 12. This eliminates all back-lash at the gear stage.

In practice, the adjusting sleeve 58 is tightened an extent more than just sufficient to remove all back-lash between the ball nuts and the screw and at the gear stage as well as at the thrust bearings. It is tightened sufficiently such as to preload the balls 34 and the rolling elements of bearings 24, 26 to an extent that the stresses built up in the balls and the grooves fall on the high rate portion of the deflection curve. This eliminates the relatively excessive deflection that would otherwise occur between the balls and the grooves if the stresses set up by the operation of the assembly lay within the low rate range of the deflection curve.

The arrangement shown in Fig. 2 is in general quite similar to that illustrated in Fig. 1. However, in the arrangement illustrated in Fig. 2, the means for eliminating back-lash from the entire assembly is designed to place the ball nut body of nuts 20 and 22 and the portion of screw 30 coextensive with the two ball nuts in tension rather than in compression. To accomplish this, the support 10 is provided with shoulders 64 against which the outer races of thrust bearings 24, 26 abut. The inner race 50 of bearing 24 abuts a retainer 66 on nut 20 while the inner race 48 of bearing 26 is abutted by a nut 68 threaded over the outer of nut 22 as at 70.

With this arrangement, when the nut 68 is tightened against bearing 26, the extent to which the two nuts 20, 22 can move axially apart is determined by the interengagement of the balls 34 with the two nuts and the shaft 30. Thus, as the nut 22 is urged in a direction axially away from nut 20, the two nuts are caused to rotate in opposite directions. The nuts and the shaft are thus placed in tension, and all back-lash is eliminated between the ball nuts and the screw, in the gear stage, and in the thrust bearings.

The arrangement illustrated in Fig. 2 is in some cases advantageous over that illustrated in Fig. 1 because in many instances, the load on screw 30 is in tension. Thus, with the arrangement illustrated in Fig. 2, the preloading on screw 30 and the actual loading on the screw are of the same nature.

Thus, it will be seen that I have provided a relatively simple means for eliminating all back-lash between the component parts of the ball nut and screw assembly. At the same time, this simple arrangement eliminates all back-lash that might otherwise occur in the gear stage as well as the thrust bearings which support the ball nuts. With respect to the gear stage, it will be appreciated that the particular arrangement shown is merely illustrative. Any desirable form of gear stage could be employed such as a bevel gear, a spur gear or a worm gear ararngement.

Furthermore, it will be appreciated that the provision of a gear stage is not essential to the utilization of the arrangement of the present invention. For example, in the arrangement shown, the gear stage could be eliminated and the shaft 30 could be utilized as the driving element. In such an arrangement, the table or other translatable component of the machine tool could be mounted on the nuts 20, 22 so that a fast feed thereof could be obtained by merely rotating shaft 30.

While reference has been made herein to the utilization of the present invention in connection with movable components of a machine tool, it will be apparent that the invention has utility in any ball and nut screw assembly wherein it is desired to eliminate all back-lash between the nut and the screw.

We claim:

1. In combination, a rotary driving member, a gear fixed on said driving member to rotate therewith, a pair of co-axially aligned gears having teeth meshing with the teeth of the first mentioned gear, a pair of axially aligned nuts fixed one to each of said aligned gears, a shaft extending axially through said aligned nuts, said nuts and shaft each having a helical ball groove thereon of like pitch, a series of balls in each nut interengaging the ball grooves of the nuts with the ball groove on the shaft, a common support for said two nuts, means journalling one of said nuts for rotation on said support in an axially fixed position, means journalling the other nut for rotation on said support and permitting axial movement of said other nut toward and away from said one nut and also permitting relative rotation of the two nuts within the clearance tolerance between said meshing teeth, said balls providing a reversible drive between the nuts and the shaft such that axial movement of the shaft produces rotary movement of said other nut, an annular sleeve threaded on said support for movement axially of said shaft, and means permitting relatively free rotary movement between and interconnecting the sleeve and said other nut in axial driving relation for moving said other nut axially toward the one nut whereby to preload the two portions of the shaft engaged by said nuts in opposite directions and to cause the teeth of said pair of gears to mesh in opposite directions with the teeth of said driving gear and thereby eliminate back-lash between the gears and between the nuts and shaft.

2. The combination called for in claim 1 wherein said support includes a cylindrical bore in which said nuts are journalled, said sleeve being threaded into said bore.

3. The combination called for in claim 1 wherein said means for journalling said other nut comprises a thrust bearing, and said sleeve is in axial abutting relation with said thrust bearing.

4. In combination, a rotary driving member, a gear fixed on said driving member to rotate therewith, a pair of co-axially aligned gears having teeth meshing with the teeth of the first mentioned gear, a pair of axially aligned nuts fixed one to each of said aligned gears, a shaft extending axially through said aligned nuts, said nuts and shaft each having a helical ball groove thereon of like pitch, a series of balls in each nut interengaging the ball grooves of the nuts with the ball groove on the shaft, a support having a cylindrical bore through which said shaft extends axially, bearing means journalling one of said nuts in said bore for rotation in an axially fixed position, a thrust bearing having an outer race slidably engaging said bore and an inner race extending circumferentially around said other nut, said other nut having a shoulder around the outer periphery thereof against which the inner race of the thrust bearing abuts axially on one side thereof, said balls forming a reversible drive between the nuts and the shaft such that axial movement of the shaft produces rotary movement of said other nut, a sleeve threaded in said bore for axial adjustment and having one end thereof abutting axially against the opposite side of the outer race of said thrust bearing, said sleeve when advanced axially in said bore shifting said other nut axially and rotatively relative to said one nut whereby to preload the two portions the shaft engaged by said nuts in opposite directions and to cause the teeth of said pair of gears to mesh with the teeth of the driving gear in opposite directions.

5. The combination called for in claim 4 wherein said shoulder is disposed toward said one nut relative to said thrust bearing, and said sleeve is disposed on the axially opposite side of the thrust bearing.

References Cited in the file of this patent

UNITED STATES PATENTS

| 1,645,276 | Burns | Oct. 11, 1927 |
| 2,124,852 | Graves et al. | July 26, 1938 |
| 2,195,799 | Parsons | Apr. 2, 1940 |

(Other references on following page)

UNITED STATES PATENTS

| | | | |
|---|---|---|---|
| 2,345,194 | Granberg et al. | Mar. 28, | 1944 |
| 2,498,897 | Riedel | Feb. 28, | 1950 |
| 2,749,812 | Wetzel | June 12, | 1956 |
| 2,778,239 | Hoover | Jan. 22, | 1957 |
| 2,842,978 | Orner | July 15, | 1958 |
| 2,905,008 | Sears | Sept. 22, | 1959 |

FOREIGN PATENTS

| | | | |
|---|---|---|---|
| 341,834 | Germany | Oct. 8, | 1921 |
| 1,000,659 | Germany | Jan. 10, | 1957 |
| 1,046,546 | France | Dec. 7, | 1953 |

OTHER REFERENCES

Machine Design, May 1953, page 140.